US00RE44333E

(19) United States
(12) Reissued Patent
Wang

(10) Patent Number: US RE44,333 E
(45) Date of Reissued Patent: Jul. 2, 2013

(54) OPTICAL DEVICE

(75) Inventor: Gin-Kon Wang, Yuan-Ho (TW)

(73) Assignee: Tian Holdings, LLC

(21) Appl. No.: 12/347,756

(22) Filed: Dec. 31, 2008

Related U.S. Patent Documents

Reissue of:
(64) Patent No.: 7,158,454
Issued: Jan. 2, 2007
Appl. No.: 10/736,546
Filed: Dec. 17, 2003

(51) Int. Cl.
*G11B 7/00* (2006.01)

(52) U.S. Cl.
USPC ..... 369/44.37; 369/112.16; 369/112.24; 369/112.28

(58) Field of Classification Search
None
See application file for complete search history.

(56) References Cited

U.S. PATENT DOCUMENTS

| | | | | |
|---|---|---|---|---|
| 5,982,732 | A | 11/1999 | Yamanaka | |
| 6,856,587 | B2 * | 2/2005 | Kim et al. | 369/53.3 |
| 2003/0026189 | A1 | 2/2003 | Richter et al. | |
| 2005/0163017 | A1 | 7/2005 | Taniguchi et al. | |

* cited by examiner

*Primary Examiner* — Muhammad N Edun
(74) *Attorney, Agent, or Firm* — Perkins Coie LLP

(57) ABSTRACT

The present invention relates to an optical device which includes a first laser diode, a beam splitter, a first objective lens, a photo-detector, a second laser diode, a wedged plate beam splitter, a second objective lens and a collimator. The present invention deploys two independent transmitting paths. The retrieving paths share the beam splitter and the photo-detector commonly at the returning route.

16 Claims, 4 Drawing Sheets

OPTICAL DEVICE

Matter enclosed in heavy brackets [ ] appears in the original patent but forms no part of this reissue specification; matter printed in italics indicates the additions made by reissue.

*CROSS-REFERENCES TO RELATED APPLICATION*

*This patent application is a reissue application for commonly assigned U.S. Pat. No. 7,158,454, issued Jan. 2, 2007, from U.S. patent application Ser. No. 10/736,546, filed Dec. 17, 2003.*

BACKGROUND OF THE INVENTION

1. Field of the Invention

The present invention relates to an optical signal pick-up device, especially to picking up data stored in compact disks with an optical pick-up head, transferring optical signals to a photo detector with dual light sources refracted by designed optical lens and the light path formed by it.

2. Background Description

Because of the rapid increase of multimedia content, there are more and more storage media needed and which meets this need are low-cost disc. Both read-writable and single-read-writable disc are popular in enterprise, home users and personal users. Therefore, there are a lot of types of disc are available in the market, such as CD, CD-R, CD-RW, DVD ROM, DVD-R/W, DVD+R/W, and so on. However, there are different optical requirement in different disc types. For example, the wavelength for CD (780 nm) and DVD (650 nm) is different, and as a result, there are usually two sets of laser diodes, lens, and photo detector in drives that can pick up signals in both CD and DVD. Although the design is simple, the cost and assembly complexity are increased. Moreover, although some drive manufactures have developed different designs of laser diode, lens, and photo detectors, there are always some problems remained. To solve this problem, the invention presents a better-integrated solution, which can meet the criteria of cost, preciseness, and assembly.

Firstly, referring to the FIG. 1, the conventional separate design provided different disc types separate optical devices. As shown in the FIG. 1, the first optical pick-up device comprises the first objective lens 12, 780 nm laser diode 13, the first beam splitter 14 and the first photo detector, while the second optical pick-up device comprises the second objective lens 17, collimator 18, 650 nm laser diode 16, the second beam splitter 19 and the second photo detector 20. The light path of the first optical pick-up device is similar to the one of the second optical pick-up device: the polarized light emitted by the laser diode is reflected by the beam splitter, passes through the objective lens, carries the signals in the disc 11, goes back through the objective lens and the beam splitter, and then is detected the optical signals by the photo detector.

As we can see in the FIG. 1, although the idea of the separate design is simple, some components of this design, one of the photo detectors, and the rear circuit are redundant, which can be surmounted. Therefore, one mechanism is added in another design to switch the optical lens in order to reach the optical requirement.

As shown in the FIG. 2, the polarized lights emitted by two laser diodes 24, 25 with different wavelength (780 nm and 650 nm) is reflected by different beam splitters 26, 27, pass through the suitable objective lens 22, 23 and projects on the disc 21, carry the optical signals in disc 21 and pass through suitable objective lens 22, 23 and beam splitter 26, 27, and then detected by the single photo detector. The adequate adjustment of the objective lens 22, 23 is due to the unique mechanism (not shown in the figure), which is used to switch the objective lens; however, due to the abrasion of the mechanism, the error of the design, and the different operation environment, the stability of this design is not good enough, also, the extra lens-adjustment mechanism increase extra cost, assembly time, and complexity.

Another design can surmount the disadvantage of the FIG. 2. That is, put different objective lens in the same light path and take the adjustment mechanism out, as shown in the FIG. 3. This optical device comprises the first laser diode 33, the second laser diode 34, the first beam splitter 35, the second beam splitter 36, the collimator 32, the objective lens 31, and the single photo detector 37. When data is picked up from different types of disc, different polarized lights are emitted by corresponding laser diode, pass through beam splitter, collimator, and objective lens, focus on the disc 30, and then feed back to the single photo detector 37. The uniqueness of this design is that the objective lens 31 can reach different requirement based on different wavelength. However, because the objective lens 31 needs special surface design and coating according to the optical characters, the price of the specific objective lens is high and the yield rate of it is low. As a result, this design is not ideal for consumer products in terms of price.

SUMMARY OF THE INVENTION

While there is incompetence in the conventional arts stated in the background of invention above, one of the goals of the present invention is to use the geometric light path formed by optical components to provide an optical device higher pick-up preciseness, easier component acquirement, and lower cost.

Another goal of the present invention is to make it feasible to use one objective lens to match a single-wavelength laser diode and make two wavelengths use the same photo detector.

The other goal is to reduce the noise by using different light path from laser diodes with different wavelengths, while they use the same beam splitter and photo detector.

Based on the goals above, the present invention provides an optical device, which comprises the first light source, provides the first polarized light needed when picking up signals; the first beam splitter, reflects the first polarized light; the first objective lens, focus the first polarized light reflected by the first beam splitter on the disc and complete the first emergent light path; the photo detector, detect the signals carried by the first polarized light, which pass through the first objective lens and first beam splitter after being reflected by the disc, and then enter the photo detector, complete the first light loop; the second light source, provides the second polarized light needed when picking up signals; the second beam splitter, reflects the second polarized light; and the second objective lens, focus the second polarized light reflected by the second beam splitter on the disc and complete the second emergent light path.

After being reflected by the disc, the second polarized light passes through the second objective lens, is reflected by the second beam splitter and the first splitter, and enters the photo detector to be detected the signals carried, complete the second light loop.

In the present invention stated above, both the first and the second light source are laser diodes, which can emit polarized light. The second beam splitter is a wedged plate beam splitter, which can complement the phase contrast.

In the present invention stated above, a better embodiment comprises: the first laser diode, provides the first polarized light needed when picking up signals; the first beam splitter, reflects the first polarized light with first side; the first objective lens, focus the first polarized light reflected by the first beam splitter on the disc and complete the first emergent light path; the photo detector, detect the signals carried by the first polarized light, which pass through the first objective lens and first beam splitter after being reflected by the disc, and then enter the photo detector, complete the first light loop; the second laser diode, provides the second polarized light needed when picking up signals; the wedged plate beam splitter, is passed through by the second polarized light emitted by the second light source behind the second beam splitter and reduce phase contrast; the collimator, calibrate the second polarized light, which has passed through the second beam splitter, to reduce phase contrast; the second objective lens, focus the second polarized light reflected by the second beam splitter on the disc and complete the second emergent light path;

After being reflected by the disc, the second polarized light passes through the second objective lens and the collimator, is reflected by the wedged plate beam splitter and the second side of the first splitter, and enters the photo detector to be detected the signals carried, complete the second light loop. Also, the first side and the second side of the first beam splitter are divided apart.

BRIEF DESCRIPTION OF THE DRAWINGS

The foregoing and other objects, aspects and advantages will be better understood from the following detailed description of a preferred embodiment of the invention with reference to the drawings, in which.

Figure 1:
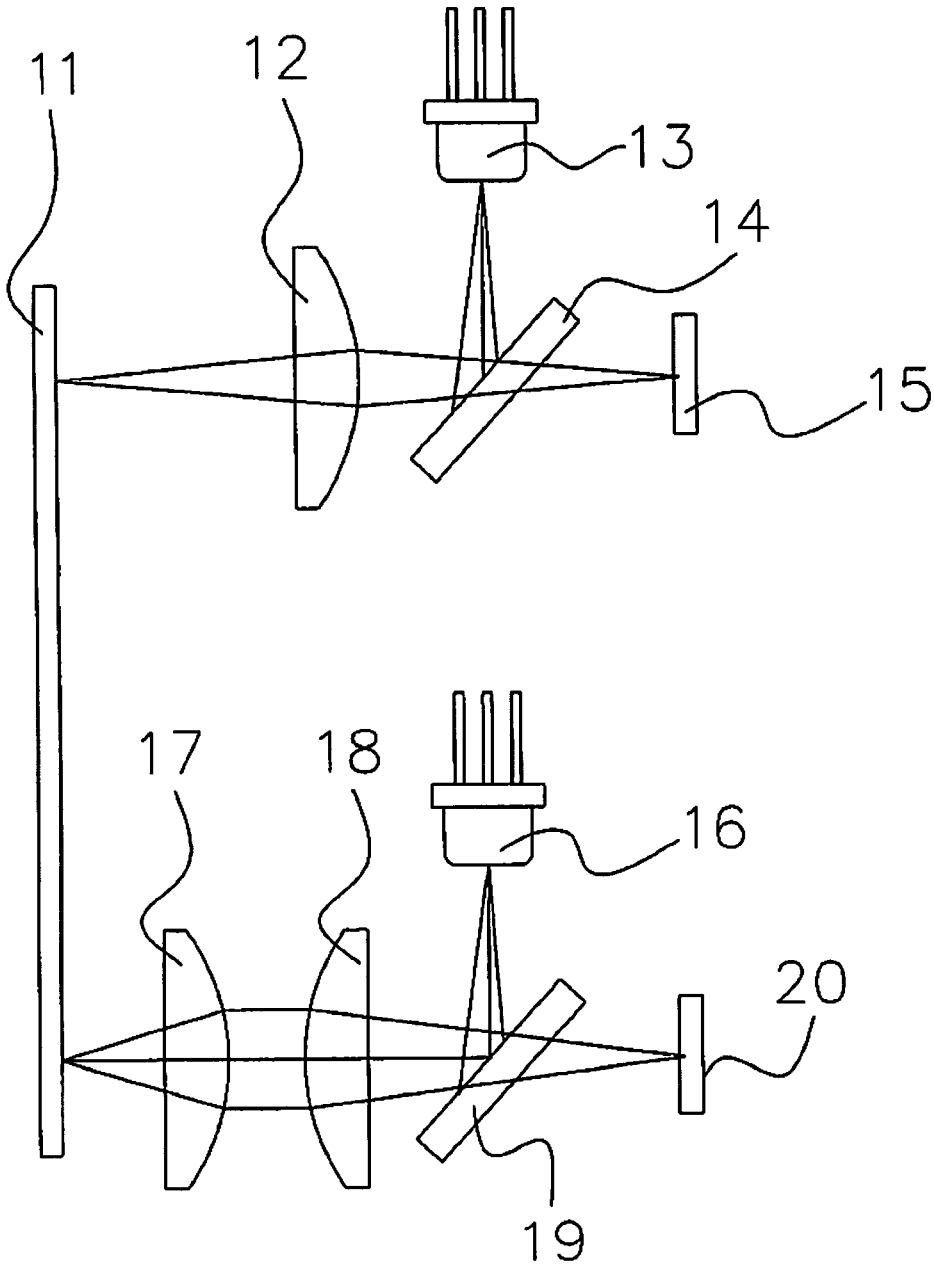
FIG. 1 presents existing optical device with separate optical pick up head.

The followings are the list of detailed legends presented in the present invention.

11: disc
12: the first objective lens
13: the first laser diode
14: the first beam splitter
15: the first photo detector
16: the second laser diode
17: the second objective lens
18: collimator
19: the second beam splitter
20: the second photo detector
21: disc
22: objective lens
23: objective lens
24: laser diode
25: laser diode
26: beam splitter
27: beam splitter
28: photo detector
30: disc
31: objective lens
32: collimator
33: the first laser diode
34: the second laser diode
35: the first beam splitter
36: the second beam splitter
37: photo detector
40: disc
41: the first objective lens
42: the second objective lens
43: collimator
44: the first laser diode
45: the second laser diode
46: the first beam splitter
47: the second beam splitter
48: photo detector

DETAILED DESCRIPTION OF A PREFERRED EMBODIMENT OF THE INVENTION

The following is a description of the present invention. However, other than the detailed description, the present can also be widely implemented in other embodiment, and the scope of the present invention is not limited and is based on the future patent scope.

Moreover, to provide more detailed description and clearer understanding of the present invention, the figures are not drawn according to the corresponding scale. Some measurement and scale have been exaggerated and some unrelated details are not drawn to make figure concise.

Figure 4:
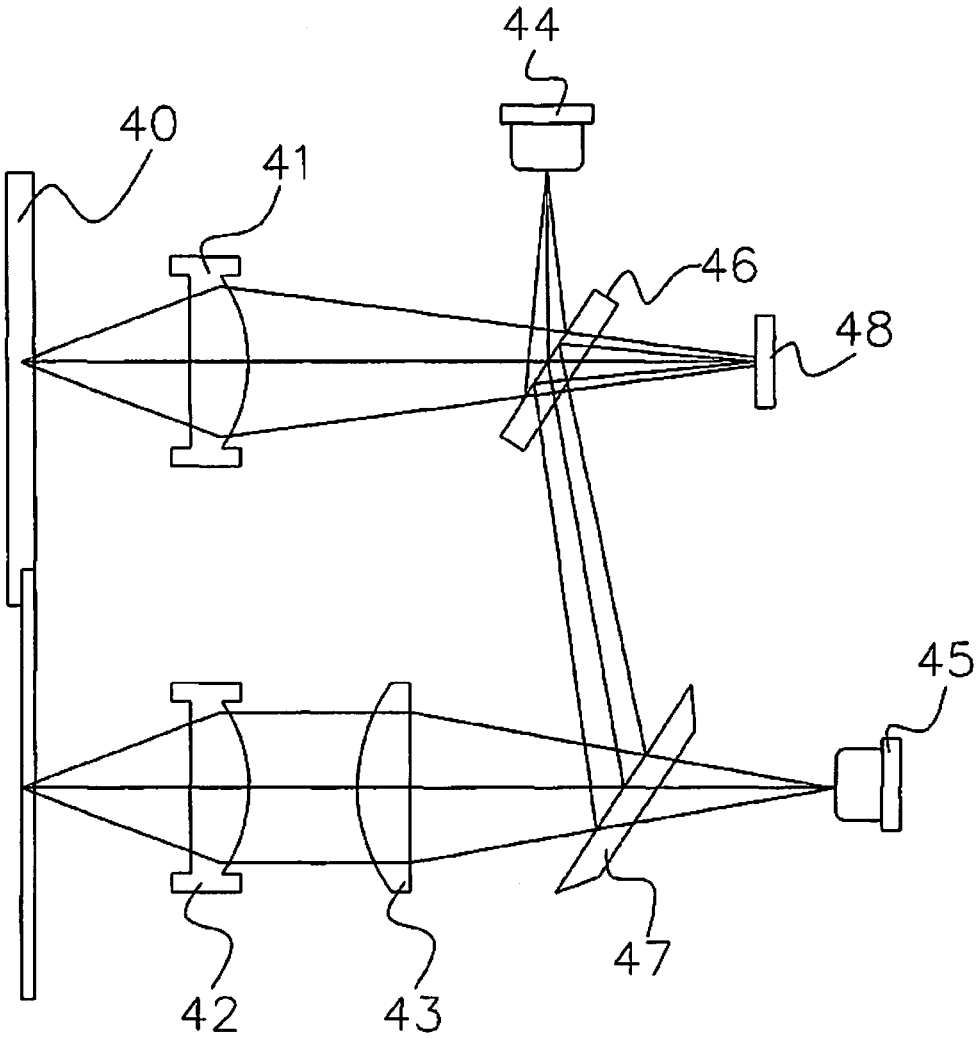
FIG. 4 presents the present invention.

The present invention is illustrated in FIG. 4, the first laser diode 44 emits a polarized light to the first beam splitter 46, after being reflected by the first beam splitter 46, the polarized light passed through the first objective lens 41 and focuses on the disc 40, which is the first light loop; in the end, the data on the disc 40 is restored after processed by the software and firmware in the circuit.

Generally speaking, the polarized light emitted by the laser diode 44 is a 780 nm linear polarized light, which is used in CD. If the first objective lens is designed adequately, the first laser diode 44 can emit 650 nm linear polarized light; meanwhile, a collimator (not shown in the figure) can be put between the first objective lens 41 and the first beam splitter 46 to reduce possible phase contrast.

On the other hand, the second laser diode 45 can be set behind the second beam splitter 47, after passing through the second beam splitter 47 and the collimator 43, the polarized light emitted by the laser diode is focused on the disc 40 by the second objective lens, which is the second emergent light path; after carrying the data in the disc 40, the polarized light pass through the second objective lens 42 and collimator 43, is reflected on the first beam splitter 46 by the second beam splitter 47, and then enter the photo detector 48 to be detected the signals, which is the second light loop.

Also, the second polarized emitted by the second laser diode is generally 650 nm linear polarized light, which is used in DVD. If the second objective lens 42 is adequately designed, the second laser diode can emit 780 nm linear polarized; meanwhile, the collimator 43 between the second objective lens 42 and the second beam splitter 47 is not necessary if the phase contrast is in the acceptable range. The reason to put collimator 43 between the second emergent light path and the second light loop is because the second laser diode 45 is put behind the second beam splitter 47 and a phase contrast is easily formed when the polarized light passed through the second beam splitter. Therefore, the second beam splitter 47 can be a wedged plate beam splitter because it can effectively complement the phase contrast. And the first beam splitter 46 can also be a wedged plate beam splitter to complement the phase contrast.

According to this, we can know that the light path of the first light loop and the second light loop are the same after the first beam splitter, so the present invention use different light paths according to different wavelengths to reduce noise, and use the same beam splitter (the first beam splitter, for example) and photo detector in the same light loop to reduce cost.

Figure 2:
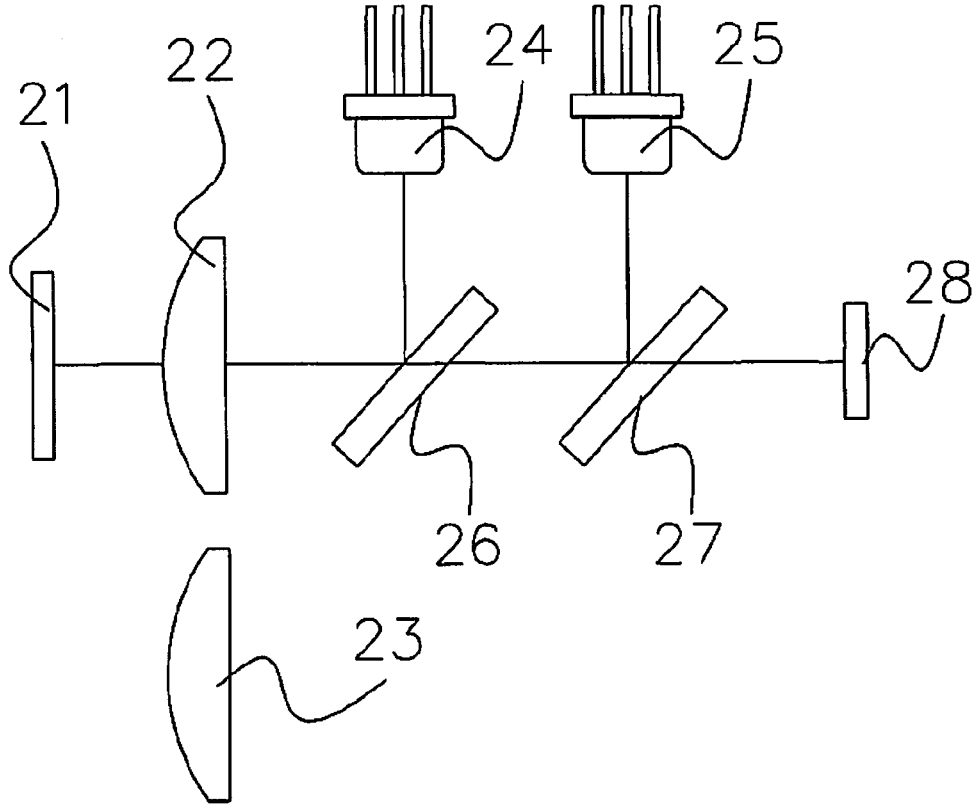
FIG. 2 presents second existing optical device.
Figure 3:
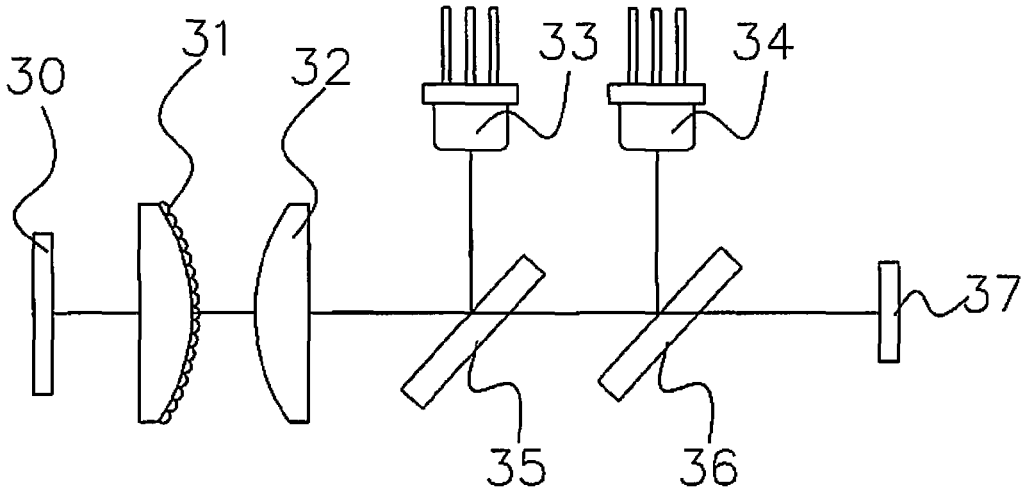
FIG. 3 presents the way to improve the second existing optical device.

Such design can achieve the separate emergent light path the same as the one in the figure one and use the single beam splitter and photo detector as shown in the FIGS. 2 and 3. Besides, the present invention use sufficiently available components, decrease cost tremendously, and have highly precise signal revolution because there is less noise (intensity noise, for example) in separate emergent light path system.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

The invention claimed is:

1. An optical device, which comprises:

a first light source, providing a first polarized light needed when picking up signals;

a first beam splitter, reflecting said first polarized light;

a first objective lens, focusing said first polarized light reflected by said first beam splitter to a disc and completing a first emergent light path; a photo detector, detecting signals carried by said first polarized light, and passing through said first objective lens and said first beam splitter after being reflected by said disc, and further entering the photo detector, to complete the first light loop;

a second light source, providing a second polarized light needed when picking up signals;

a second beam splitter, reflecting said second polarized light; and a second objective lens, focusing said second polarized light reflected by said second beam splitter on said disc and completing said second emergent light path, wherein after being reflected by said disc, said second polarized light passes through said second objective lens, and is reflected by said second beam splitter and said first splitter, and therefore enters said photo detector to be detected with the signals carried, in order to complete the second light loop.

2. The optical device of claim 1, further comprising an objective lens put between said second beam splitter and said second objective lens to complement the phase contrast of said second polarized light.

3. The optical device of claim 1, further comprising an objective lens put between said first beam splitter and said first objective lens to complement the phase contrast of the first polarized light.

4. The optical device of claim 1, wherein the reflection surface of said first polarized light on said first beam splitter and the reflection surface of said second polarized light on said first beam splitter are on the different side of said first beam splitter.

5. The optical device of claim 1, wherein said first light source is a laser diode, which emits linear polarized light.

6. The optical device of claim 1, wherein said second light source is a laser diode, which emits linear polarized light.

7. The optical device of claim 1, wherein said first beam splitter is a wedged plate beam splitter, which complements phase contrast.

8. The optical device of claim 1, wherein said second beam splitter is a wedged plate beam splitter, which complements phase contrast.

9. An optical device, which comprises:

a first laser diode, providing a first polarized light needed when picking up signals;

a first beam splitter, reflecting said first polarized light with a first side;

a first objective lens, focusing said first polarized light reflected by said first beam splitter on a disc and completing a first emergent light path;

a photo detector, detecting said signals carried by said first polarized light, passing through said first objective lens and said first beam splitter after being reflected by said disc, and further entering said photo detector, to complete the first light loop;

a second laser diode, providing a second polarized light needed when picking up signals;

a wedged plate beam splitter, passed through by said second polarized light emitted by said second light source behind said second beam splitter and reducing phase contrast;

a collimator, calibrating the second polarized light, passed through said second beam splitter, to reduce phase contrast; and a second objective lens, focusing said second polarized light reflected by said second beam splitter on said disc in order to complete the second emergent light path, wherein after being reflected by said disc, said second polarized light passes through said second objective lens and said collimator, is reflected by said wedged plate beam splitter and said second side of said first splitter, and enters said photo detector to be detected said signals carried, in order to complete the second light loop.

10. The optical device of claim 9, a first side and a second side of said first beam splitter are divided apart.

*11. An optical device, comprising:*

*a first light source configured to provide a first light;*

*a first beam splitter configured to direct the first light;*

*a first lens configured to focus the directed first light to an optical storage medium to form a first light signal and to transmit the first light signal back to the first beam splitter;*

*a photodetector configured to receive the first light signal from the first beam splitter;*

*a second light source configured to provide a second light;*

*a second beam splitter configured to reflect the second light; and*

*a second lens configured to focus the reflected second light to another storage medium to form a second light signal and to transmit the second light signal back to the second beam splitter, wherein the second beam splitter subsequently reflects the second light signal to the first beam splitter, which subsequently reflects the second light signal to the photodetector.*

*12. The optical device of claim 11, wherein the first light source is a laser diode configured to emit a linear polarized light.*

*13. The optical device of claim 11, wherein the second light source is a laser diode configured to emit a linear polarized light.*

*14. The optical device of claim 11, wherein the first beam splitter is a wedged plate beam splitter.*

*15. The optical device of claim 11, wherein the second beam splitter is a wedged plate beam splitter.*

*16. A method for reading data, the method comprising:*

*emitting a first light beam from a first light source;*

*directing the first light beam to an optical storage medium using a first beam splitter to form a first light signal and reflecting the first light signal back to the first beam splitter;*

*receiving the first light signal from the first beam splitter using a photo detector;*

*emitting a second light beam from a second light source;*

*directing the second light beam to another optical storage medium using a second beam splitter to form a second light signal and reflecting the second light signal back to the second beam splitter;*

*reflecting the second light signal from the second beam splitter to the first beam splitter;*

*reflecting the second light signal from the first beam splitter to the photo detector; and*

*receiving the second light signal from the first beam splitter using the photo detector.*

* * * * *